No. 864,268. PATENTED AUG. 27, 1907.
J. W. SCHATZ.
SPOOL FOR PHOTOGRAPHIC FILMS.
APPLICATION FILED AUG. 24, 1906.
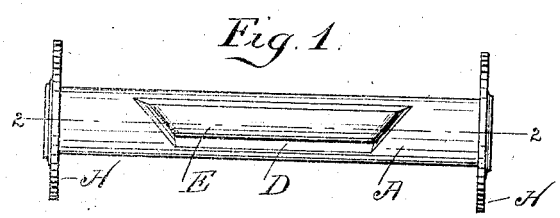
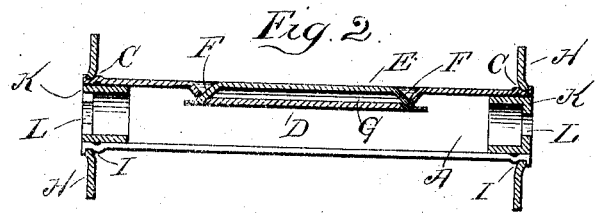
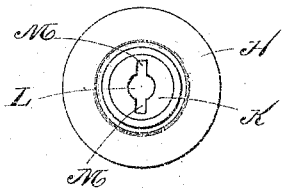 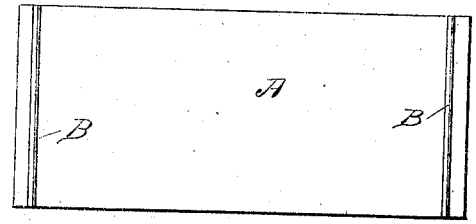

UNITED STATES PATENT OFFICE.

JOHN WILLIAM SCHATZ, OF CHAPPAQUA, NEW YORK, ASSIGNOR TO HIMSELF AND HERRMAN A. SCHATZ, OF CHAPPAQUA, NEW YORK.

SPOOL FOR PHOTOGRAPHIC FILMS.

No. 864,268.  Specification of Letters Patent.  Patented Aug. 27, 1907.

Application filed August 24, 1906. Serial No. 331,920.

*To all whom it may concern:*

Be it known that I, JOHN WILLIAM SCHATZ, of the town of Chappaqua, county of Westchester, and State of New York, have invented new and useful Improvements in Spools for Photographic Films, of which the following is a full, clear, and exact description when taken in connection with the accompanying drawings.

This invention has for its object the production of a sheet metal spool for photographic films, and consists of the various improvements and combinations of parts set forth and claimed hereinafter.

Spools for photographic films have ordinarily been made of a wooden dowel with steel flanges on the ends. A spool of this construction is apt to shrink or expand under varying temperatures and affect disastrously the films wound thereon. Furthermore, in turning a wooden spool inaccuracies are apt to occur as well as in drilling the hole or axial bore of the spool. These inaccuracies are avoided in the present invention. In wooden spools, the shrinkage or contraction of the hub is apt to release the flange so that it may come off.

In the metal spool described herein, the flanges at the end of the spool may be fastened securely and squarely on the hub or shank, and the hollow form of the spool insures its lightness.

Referring to the drawings, Figure 1 represents a side elevation of a spool embodying the invention, Fig. 2, a longitudinal section on line 2—2 of Fig. 1, Fig. 3, a view of the envelop or blank from which the hub of the spool is formed, and Fig. 4, an end view of the spool.

In all figures, similar letters of reference represent like parts.

The parts designated by the letter A represent the hub or shank of the spool which is formed of the blank or envelop, shown in Fig. 3, rolled longitudinally. Near the ends of the blank beads B are formed, which when the hub is formed produce annular shoulders C. At its center, the hub is flattened to form a depression D, and across the depression lengthwise with the hub extends a bridge E, the ends of which F are forced into the hub and whose outer surface conforms to the arc of the circumference of the hub of the spool (Figs. 1 and 2). A narrow space or opening G is thus provided between the hub and bridge, which opening forms the slot for holding the end of the film or paper outside of the film.

H designates the end flanges of the spool, which are formed separately from the hub, with circular perforations through which the ends of the hub project until the beads or annular shoulders C come in contact with the inner side of the flanges and prevent further movement. The flanges, as shown more particularly in Fig. 2, are depressed at their center, as shown at I, so that the shoulders C will fit into the flanges and prevent crimping in the rolling or winding of the film.

Thimbles K are adapted to fit into the ends of the hub A and hold the ends of the hub rigid. The thimbles K are provided with the usual perforations L for application for use in placing the spool in the camera. One of these perforations is provided with wings M of well known form.

Having now described my invention, what I claim and desire to secure by Letters Patent, is:—

1. In a spool for photographic films, a hub formed of sheet metal rolled longitudinally, having a longitudinal depression on one side thereof, substantially as described.

2. In a spool for photographic films, the combination with a hub formed of sheet metal rolled longitudinally, having a longitudinal depression on one side thereof; of a bridge projecting longitudinally with said hub over said depression, whereby a narrow opening is formed between said bridge and hub, substantially as described.

3. In a spool for photographic films, the combination with a hub formed of sheet metal rolled longitudinally, and having a longitudinal depression; of a bridge projecting over said depression and having its outer surface conform to the arc of the circumference of said hub, substantially as described.

4. In a spool for photographic films, the combination with a hub formed of sheet metal rolled longitudinally; of flanges mounted on the ends of said hub; and thimbles projecting into the ends of said hub, substantially as described.

5. In a spool for photographic films, the combination with a hub formed of sheet metal rolled longitudinally having annular shoulders or beads near the ends; of flanges mounted on the ends of said hub having a central depression to take over said beads or shoulders, substantially as described.

6. In a spool for photographic films, the combination with a hub formed of sheet metal rolled longitudinally; of flanges mounted on the ends of said hub, and thimbles fitting in the ends of said hub having perforations axial with said hub, substantially as described.

In witness whereof, I have hereunto set my hand on the 21st day of August, 1906.

JOHN WILLIAM SCHATZ.

Witnesses:
H. A. SCHATZ,
T. H. WARNER.